L. D. NOBLE.
CORN-PLANTER.
No. 123,121. Patented Jan. 30, 1872.
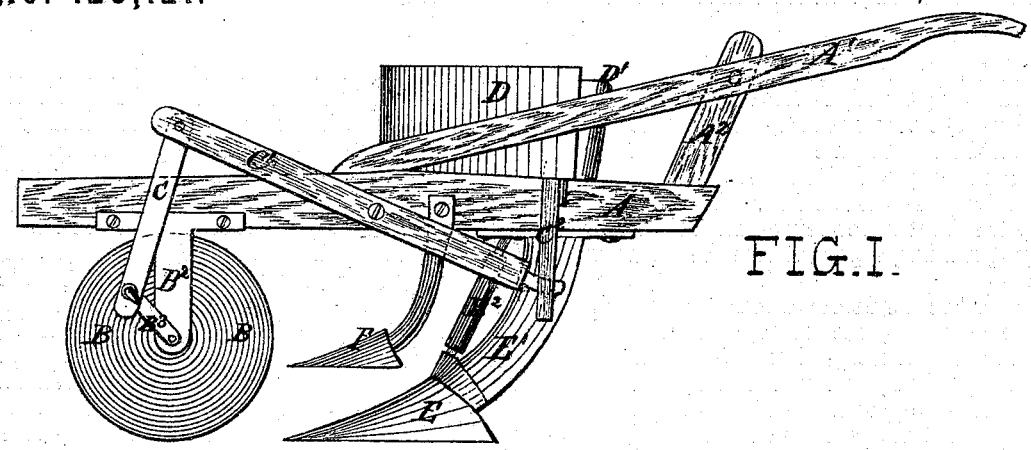
FIG. I.
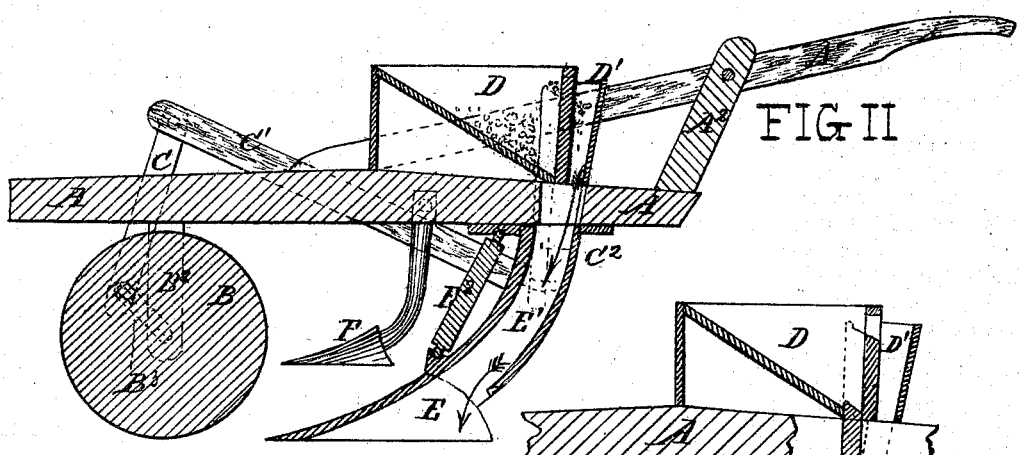
FIG. II.
FIG. IV.
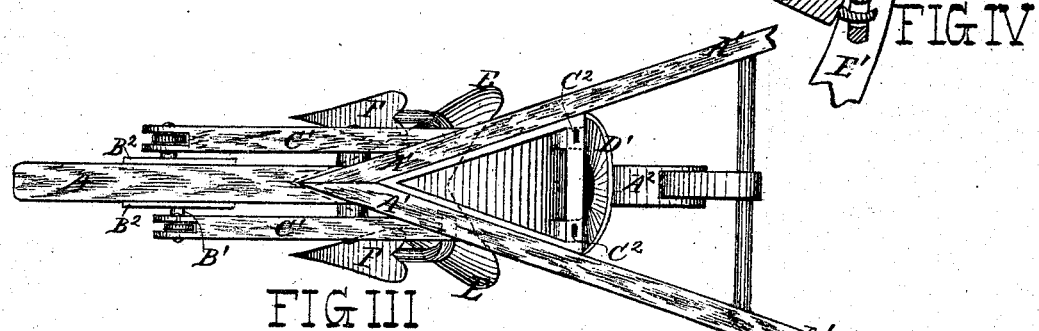
FIG. III.
ATTEST
A. Ruppert
Wile Dodge
INVENTOR
L. D. Noble
D. P. Holloway & Co
Attys

UNITED STATES PATENT OFFICE.

L. DAVIS NOBLE, OF CERRO GORDO, ILLINOIS.

IMPROVEMENT IN WALKING PLANTERS.

Specification forming part of Letters Patent No. 123,121, dated January 30, 1872; antedated January 27, 1872.

*To all whom it may concern:*

Be it known that I, L. DAVIS NOBLE, of Cerro Gordo, in the county of Piatt and State of Illinois, have invented a certain Improvement in Corn-Planters; and I do hereby declare that the following is a full, clear, and exact description thereof, reference being had to the annexed drawing making a part of this specification, in which—

Figure 1 is a side elevation of my improved planter, showing the beam, one handle, the seed-box, the cutting-roller, the crank and lever for operating one of the dropping-slides, the subsoil-plow, and one of the small plows. Fig. 2 is a central sectional elevation, showing the small roller of the subsoil-plow, the passage through its helve or standard, and the slide which deposits the corn or seeds in such passage. Fig. 3 is a top or plan view, showing the arrangement of the parts. Fig. 4 is a sectional elevation, showing the manner of operating one of the seed-distributing or dropping slides.

Corresponding letters refer to corresponding parts in the several figures.

This invention relates to that class of implements which are denominated corn-planters; and it consists in certain combinations and arrangements which are designed to adapt it for use upon prairies or other places where the earth is covered with sod, and, by the removal of some of its parts, to adapt it for use in places where no sod exists, as will be more fully explained hereinafter.

In constructing implements of this character, and in accordance with my invention, I use a beam, A, similar in construction to the beam of a plow, it being nearly straight except at its front end, where it is bent or curved upward slightly, in order that the force which is applied to move it shall tend to draw or press it downward slightly, so that the wheel or cutter which it carries shall be forced into the earth properly. To the surface of this beam I attach handles $A^1 A^1$ in any convenient manner, their rear portions resting upon a support affixed to a standard, $A^2$, in the rear end of the beam. Near the forward end of the beam there is placed a roller, B, which is held in suitable hangers $B^2 B^2$, which are bolted to the beam and have their lower ends provided with boxes or apertures for the reception of a shaft, $B^1$, which carries upon its outer ends cranks $B^3 B^3$. The arrangement of this roller or cutter is such that when in use its cutting-edge shall cut and part the soil directly in front of the point of the subsoil-plow, and thus permit it to turn the sod in both directions. Attached to the cranks $B^3 B^3$ are connecting-rods C C, the upper ends of which are connected to doors $C^1 C^1$, said levers being pivoted to the beam A, in order that as their front ends are moved by the rods C C their rear ends shall operate the seed-distributers or dropping-slides $C^2 C^2$ in the seed-box D, which is placed upon the top of the beam A, and so arranged that the dropping-slides enter its lower portion and pass up near its rear end, and, as they are moved from their lowest position upward, they shall take upon their upper ends a suitable number of kernels of corn or of other seeds and carry them to a separate compartment, $D^1$, of the seed-box, or into a tube attached to said box, from which they pass into the hollow helve or standard of the subsoil-plow. It will be apparent that, in consequence of the connection between the roller or cutter B and the seed-dropping slides, the distance between the hills planted will be regulated, there being two droppings to each revolution of the wheel. In order that, in planting in soddy ground, a proper receptacle may be formed for the seed, a subsoil-plow, E, is attached to the beam A near its rear end, its helve or standard $E^1$, by which it is connected to the beam, being hollow, to allow the corn or other seed to pass down through it and be deposited in the soft earth below the sod. This plow is so constructed as to turn a furrow in two directions at right angles to the direction of its movement, and it is designed to run it at such a depth in the earth as to turn the sods away from the furrow in which the corn is deposited, and not permit them to fall back upon the corn, the sods being prepared for this movement by the action of the cutting-wheel or roller B, its outer surface being made sufficiently sharp or thin to allow it to cut or sever the sod in front of this plow. In order that the turning of the sods may be facilitated, a roller, $E^2$, is placed in front of the helve or standard E, as shown in Fig. 2, so that, as the turf or sod comes in contact with it, it shall be rolled away from the helve and shall have the proper direction given to it with as little frictional resistance as possible. When the implement is to be used in old ground, or in ground which is free from sod, small shovels F F may be attached to the beam A, upon each side thereof and just forward of the subsoil-plow, their office being to loosen up the earth in front of such plow and place it in position to be readily brought around the plants when they become large enough to cultivate. It is not intended to use these shovels when planting soddy ground, but at such times they are to be removed and laid aside, and, if found desirable, the wheel or roller B may be removed and one with a broader face put in its place.

What I claim as my invention, and desire to secure by Letters Patent, is—

1. A corn-planting implement, combining in its construction a subsoil-plow, E, arranged for turning furrows in two directions, a corn or seed box, D, with the mechanism for operating its dropping-slides, and a cutting-wheel, B, for separating the sod in front of the plow, substantially as and for the purpose set forth.

2. The combination, with the helve $E^1$ and roller $E^2$ of a corn-planter, of the cutting-roller B, the parts being arranged, with reference to each other, substantially as shown and described.

In testimony whereof I have signed my name to this specification in the presence of two subscribing witnesses.

L. DAVIS NOBLE.

Witnesses:
 WILLIAM L. PITTS,
 SOLOMON WELTY.